Dec. 24, 1940.  I. M. BEROLSKY  2,226,194
SOLDERING PLIERS
Filed Sept. 29, 1939  2 Sheets-Sheet 1
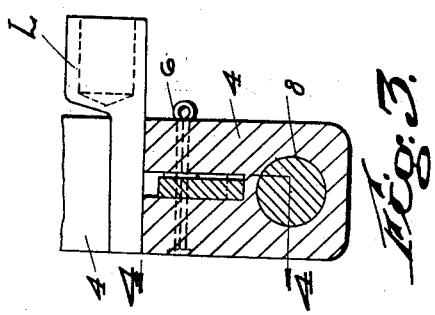
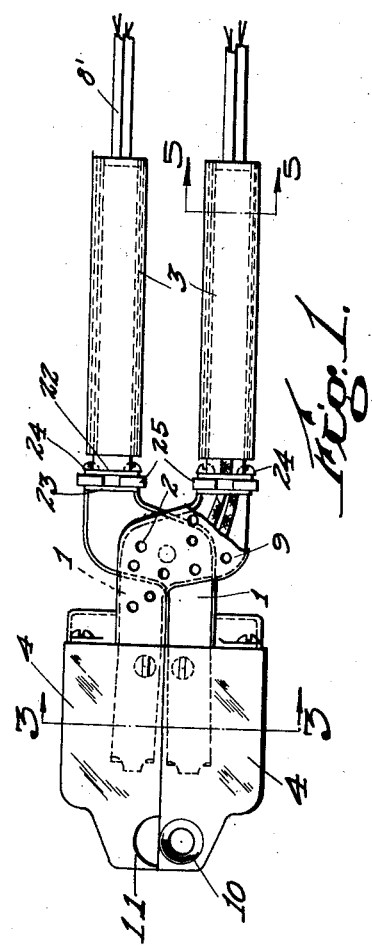
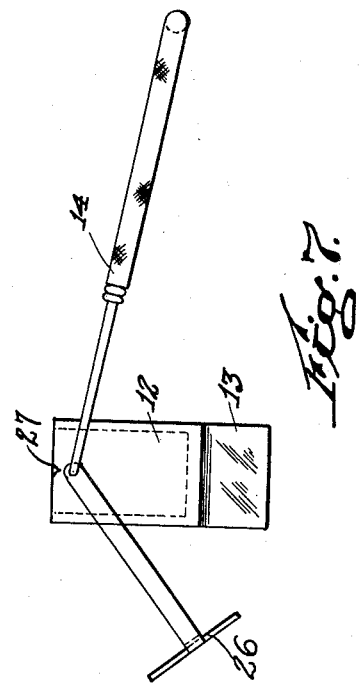
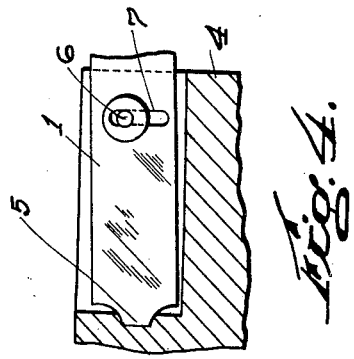
Inventor:
Isadore M. Berolsky
By Charles A. Warren
Attorney Dec. 24, 1940.　　　I. M. BEROLSKY　　　2,226,194
SOLDERING PLIERS
Filed Sept. 29, 1939　　　2 Sheets-Sheet 2
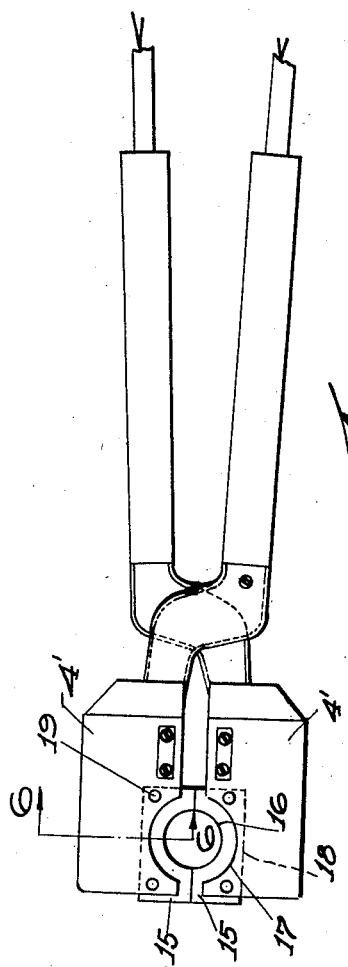
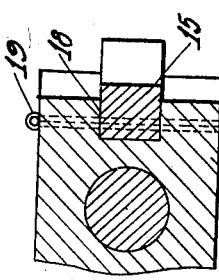
Inventor:
Isadore I. Berolsky
By Charles O. Warren
Attorney Patented Dec. 24, 1940

2,226,194

UNITED STATES PATENT OFFICE 2,226,194

SOLDERING PLIERS

Isadore M. Berolsky, Worcester, Mass.

Application September 29, 1939, Serial No. 297,141

5 Claims. (Cl. 113—105)

The present invention relates to soldering pliers and particularly to pliers operating from a readily available source of electrical power without the necessity for transformers or other means for converting the power to a different voltage or type of power.

Where a considerable amount of soldering of elements is required, as for example in the installation of electric wiring, or in the attachment of connecting lugs to the ends of electric cables, it is desirable to have a soldering device which can be readily portable and which will not require for heating of the elements to be soldered, an open flame, such as the conventional blow torch.

One of the principal objects of the present invention is to provide a pair of pliers by which elements to be soldered may be brought to the desired soldering temperature and by which the solder to be applied may be retained in the fluid form necessary for satisfactory soldering.

Devices applicable for specific purposes have been developed, as shown for example in the Benson Patent No. 1,845,475, in which a pair of soldering irons are pivotally connected together and are provided with a plurality of recesses varying in size. In these recesses lugs of varying dimension are clamped for heating, but the solder must be separately applied as there is no provision in this device for heating the solder. Moreover, a device of this character is incapable of heating elements not conforming in shape to the recess provided. Another feature of the present invention is the provision of a universally applicable soldering device which is usable in the soldering of pieces varying greatly in shape and size.

Other and further objects and advantages of the invention will hereinafter more fully appear, reference being had to the accompanying drawings in which—

Fig. 1 is a plan view of a device embodying the invention, with parts in section.

Fig. 2 is a plan view corresponding to Fig. 1 and showing a modified form of the device.

Fig. 3 is a sectional view along the line 3—3 of Fig. 1.

Fig. 4 is a sectional view along the line 4—4 of Fig. 3.

Fig. 5 is a sectional view along the line 5—5 of Fig. 1.

Fig. 6 is a sectional view along the line 6—6 of Fig. 2.

Fig. 7 is a side elevation of a solder pot.

With reference first to Fig. 1, the device which is in the form of a pair of pliers, has arms 1 pivoted together by a pivot pin 2. The ends of the arms on one side of the pivot pin have insulating handles 3 positioned thereon and the other ends of the arms have opposed heads 4 which form the heating jaws of the pliers. Each head, as shown, instead of being connected rigidly to the arm, is pivoted, as at 5, to the end of the arm, and a pin 6 carried by each head is movable in a slot 7 in the arm, this pin limiting the relative turning movement of the head. By this arrangement the adjacent faces of the jaws may remain in parallel relation to each other regardless of the spacing thereof in order that a flat piece of stock may be clamped securely with a considerable area of each face of the jaws in contact therewith.

Each head or jaw has a heating element 8 therein which assures a proper heating of the jaw to the desired temperature, and power for each of these heating elements is provided by wiring 8' extending through the insulated handles and along the arms. The wire may be shielded by a guard 9 extending over the arm between the handle and jaw and in this event the guard is preferably perforated to prevent any considerable amount of transfer of heat along the arms from the jaws.

One of the jaws preferably has a recess 10, which, during use, is filled with solder, and in which cable or wires to be soldered may be immersed. It will be understood that the heat of the jaws will maintain this solder at the proper temperature. In the opposite jaw may be formed a semi-cylindrical recess 11 in which odd sizes of pieces may be heated for soldering, especially semi-circular pieces.

In use the pliers which are particularly adapted for soldering conventional lugs on the ends of electrical cables are so manipulated that the flat portion of the lug L is placed between the jaws and they are held securely by the handles against the opposite sides of the lugs, as shown. Heat is transferred from the jaws to the lug and when the lug is at the proper temperature the end of the wire is dipped in the solder and placed in the cylindrical portion of the lug which has been at least partly filled with solder. By this arrangement it is possible to provide for the rapid soldering of lugs of any size to the corresponding cable, since the jaws will clamp flatly against the opposite faces of the lug regardless of the thickness thereof. For lightness and for a quick heating and transfer of heat to the lug it has been found desirable in many instances to make the jaws of aluminum.

For soldering elements other than lugs to the ends of electric cables it may be desirable to have a separate pot for solder, into which the wires may be dipped, and this is especially desirable where the position of the elements to be soldered, or their location is such that they cannot be placed in the opening in the end of the jaw of the pliers. In this event, a solder pot 12 having a flat web 13 on the bottom thereof, and if desired, a bail 14, may be heated by clamping the flat web on the pot between the jaws of the pliers. By this arrangement it is possible to have a pot of solder at the desired temperature into which articles for soldering may be dipped.

With reference now to Fig. 2, the pliers are in general of the same construction as in Fig. 1, with the exception that a portion of the jaws is made removable in order that the pliers may be adapted to a specific soldering job where there is enough work to be done to justify a particular plier construction. As shown, each jaw or head 4' has a removable section 15 at the end thereof and these removable sections have their adjacent surfaces shaped to fit the particular device to be soldered. In the arrangement shown the device is adapted for clamping round articles, and accordingly each of the elements 15 has a semi-circular recess 16 therein. The jaw 4' also has a semi-circular recess 17 therein which is the shape of the largest diameter element for which the pliers are adapted. The recess 17 is thus larger in diameter than the recess 16 in the sections 15 and these sections may be replaced by other sections having larger recesses. To hold the sections 15 the jaws have opposed notches 18 therein and suitable fastening means, as for example, cotter pins 19 retain these sections in place.

For a more complete insulation of the handles to prevent burning of the user's hands, the handles, as shown in Figs. 1 and 5 are made up of spaced sleeves 20 of suitable heat insulating material, such as fiber, with the sleeves held in spaced relation by suitable spacing washers 21. The inner sleeve fits over the end of the arm 1.

For further insulation, if desired, as shown for example in Fig. 1, the portions of the arms 1 over which the handles 3 are positioned, instead of being integral with the remainder of the arms, are insulated therefrom. To this end the handle portion of each arm has a flange 22 thereon and the other part of each arm also has an opposed flange 23. Suitable clamping bolts 24 fasten these two flanges in spaced relation to each other, an insulating washer or washers 25 maintaining the desired spacing.

Although generally the pliers will be used for heating directly the articles to be soldered, as shown in the drawings, the solder pot 12 may be used whenever desired, especially with odd-shaped elements not readily adapted for direct heating by the pliers. Since the pot has a flat web on the bottom, the solder in the pot is readily and quickly melted by clamping the jaws onto the flat web. The pliers are thus universally applicable to all types of soldering and are particularly useful in wiring buildings and the like, since the connected wires are readily dipped into the solder pot 12. This latter may have, as shown in the drawings, a support 26 pivoted on the same axis as the bail 14, this support being swung out of the way for heating the pot and providing for supporting the pot without tipping when the solder is melted. The pot also preferably has a pouring spout 27, as shown.

I claim:

1. Soldering pliers comprising a pair of pivotally connected arms, and heated jaws on one end of each of said arms, said jaws having their opposed surfaces substantially flat throughout their length, and a pivotal connection between the end of said arms and the jaws mounted thereon so that the opposed surfaces of the jaws will remain in parallel relation to each other independently of the spacing thereof.

2. Soldering pliers comprising a pair of pivotally connected arms, and heated jaws on one end of each of said arms, said jaws being mounted on the arms so that the opposed surfaces of the jaws will remain in parallel relation to each other independently of the spacing thereof, one of said jaws having a recess in one of the side surfaces in which solder is retained and heated.

3. Soldering pliers comprising a pair of pivotally connected arms, a heated jaw on one end of each of said arms, a pivotal connection between the end of each arm and the jaw mounted thereon to provide for rocking movement of said jaws on the arms so that the opposed surfaces of the jaws may remain in parallel relation to each other independently of the spacing thereof, and means for insulating the opposite ends of the arms to provide handles.

4. Soldering pliers comprising a pair of pivotally connected arms, a heated jaw on one end of each of said arms, said jaws having opposed surfaces, and releasable inserts positioned in and projecting beyond the opposed surfaces of said jaws with the inserts in opposed relation to each other.

5. Soldering pliers comprising a pair of pivotally connected arms, a heated jaw on one end of each of said arms, said jaws having opposed surfaces and releasable inserts positioned in and projecting beyond the opposed surfaces of said jaws with the inserts in opposed relation to each other, said inserts having cooperating notches in their adjacent surfaces.

ISADORE M. BEROLSKY.